(12) United States Patent
Kamon

(10) Patent No.: US 11,948,080 B2
(45) Date of Patent: Apr. 2, 2024

(54) IMAGE PROCESSING METHOD AND IMAGE PROCESSING APPARATUS

(71) Applicant: FUJIFILM Corporation, Tokyo (JP)

(72) Inventor: Shumpei Kamon, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 376 days.

(21) Appl. No.: 17/159,171

(22) Filed: Jan. 27, 2021

(65) Prior Publication Data

US 2021/0150277 A1 May 20, 2021

Related U.S. Application Data

(63) Continuation of application No. PCT/JP2019/030255, filed on Aug. 1, 2019.

(30) Foreign Application Priority Data

Aug. 8, 2018 (JP) .................. 2018-149388

(51) Int. Cl.
*G06N 3/08* (2023.01)
*G06F 18/20* (2023.01)
(Continued)

(52) U.S. Cl.
CPC ............ *G06N 3/08* (2013.01); *G06F 18/2148* (2023.01); *G06F 18/285* (2023.01); *G06N 3/04* (2013.01);
(Continued)

(58) Field of Classification Search
CPC ........ G06N 3/08; G06N 3/04; G06F 18/2148; G06F 18/285; G06V 2201/03
See application file for complete search history.

(56) References Cited

U.S. PATENT DOCUMENTS 11,144,814 B2 * 10/2021 Cha .................. G06T 7/001
2017/0004399 A1    1/2017 Kasahara
(Continued)

FOREIGN PATENT DOCUMENTS

| JP | 2002042107 | 2/2002 |
| JP | 2017016414 | 1/2017 |
| WO | 2017175282 | 10/2017 |

OTHER PUBLICATIONS

"International Search Report (Form PCT/ISA/210) of PCT/JP2019/030255," dated Oct. 29, 2019, with English translation thereof, pp. 1-3.
(Continued)

*Primary Examiner* — Qun Shen
(74) *Attorney, Agent, or Firm* — JCIPRNET

(57) ABSTRACT

An object of the present invention is to provide an image processing method and an image processing apparatus that make it possible to efficiently learn images having different identities. In learning and recognition using a hierarchical network, it is known that, based on experiences, a layer near the input functions as a feature extractor for extracting a feature that is necessary for recognition, and a layer near the output performs recognition by combining extracted features. Thus, performing learning by setting a higher learning rate to a layer near the input side of the hierarchical network than a learning rate in a layer near the output side in second learning processing as in an aspect of the present invention corresponds to mainly relearning (adjusting) a feature extraction portion in data sets having different identities. Accordingly, the difference between data sets can be absorbed, and learning can be performed more efficiently than in the case of simply performing transfer learning.

16 Claims, 11 Drawing Sheets

(51) Int. Cl.
   *G06F 18/214*   (2023.01)
   *G06N 3/04*     (2023.01)
   *G06V 10/25*    (2022.01)
   *G06V 10/44*    (2022.01)
   *G06V 10/70*    (2022.01)
   *G06V 10/82*    (2022.01)
   *G06V 10/94*    (2022.01)

(52) U.S. Cl.
   CPC ............ *G06V 10/25* (2022.01); *G06V 10/454* (2022.01); *G06V 10/82* (2022.01); *G06V 10/87* (2022.01); *G06V 10/95* (2022.01); *G06V 2201/03* (2022.01)

(56) References Cited

U.S. PATENT DOCUMENTS

| | | | |
|---|---|---|---|
| 2017/0032222 A1 | 2/2017 | Sharma et al. | |
| 2017/0278289 A1* | 9/2017 | Marino | G06T 7/536 |
| 2017/0343481 A1* | 11/2017 | Jahanshahi | G06N 20/00 |
| 2019/0034800 A1 | 1/2019 | Shiratani | |
| 2019/0065901 A1* | 2/2019 | Amato | G06F 18/24133 |
| 2019/0102646 A1* | 4/2019 | Redmon | G06V 20/20 |
| 2020/0175719 A1* | 6/2020 | Wright | G06T 7/262 |

OTHER PUBLICATIONS

"Written Opinion of the International Searching Authority (Form PCT/ISA/237) of PCT/ JP2019/030255," dated Oct. 29, 2019, with English translation thereof, pp. 1-9.

* cited by examiner

FIG. 2A

INPUT LAYER (562A) → CONVOLUTIONAL LAYER (564) → POOLING LAYER (565) → CONVOLUTIONAL LAYER → ⋯ → CONVOLUTIONAL LAYER → POOLING LAYER → CONVOLUTIONAL LAYER → OUTPUT LAYER (562C)

INPUT LAYER (562A) → CONVOLUTIONAL LAYER (564) → POOLING LAYER (565) → CONVOLUTIONAL LAYER → ⋯ → CONVOLUTIONAL LAYER → POOLING LAYER → CONVOLUTIONAL LAYER → FULLY CONNECTED LAYER (566) → OUTPUT LAYER (562C)

(562B, 562)

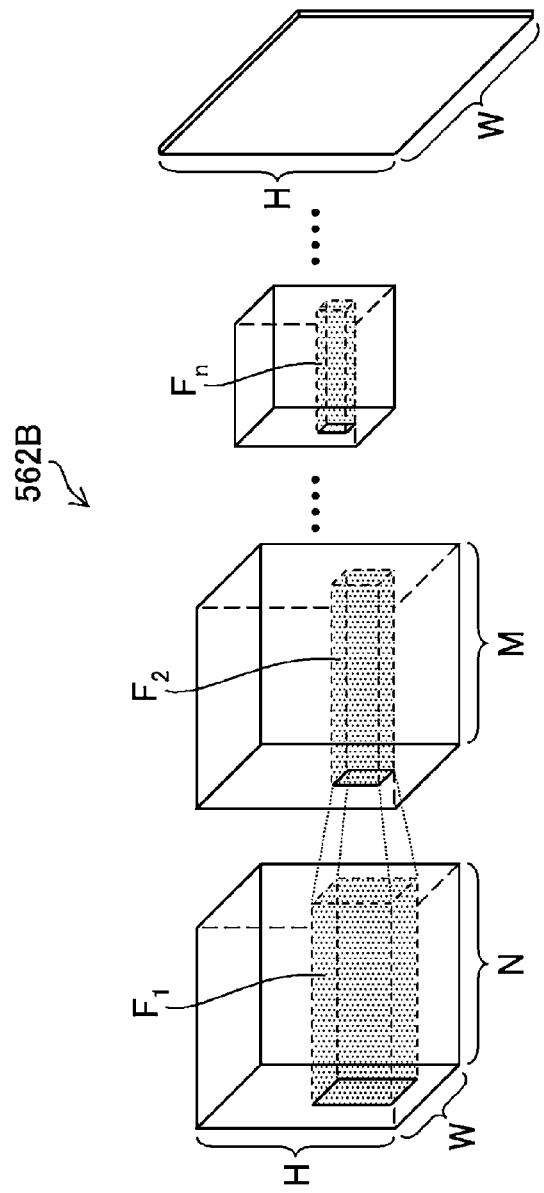

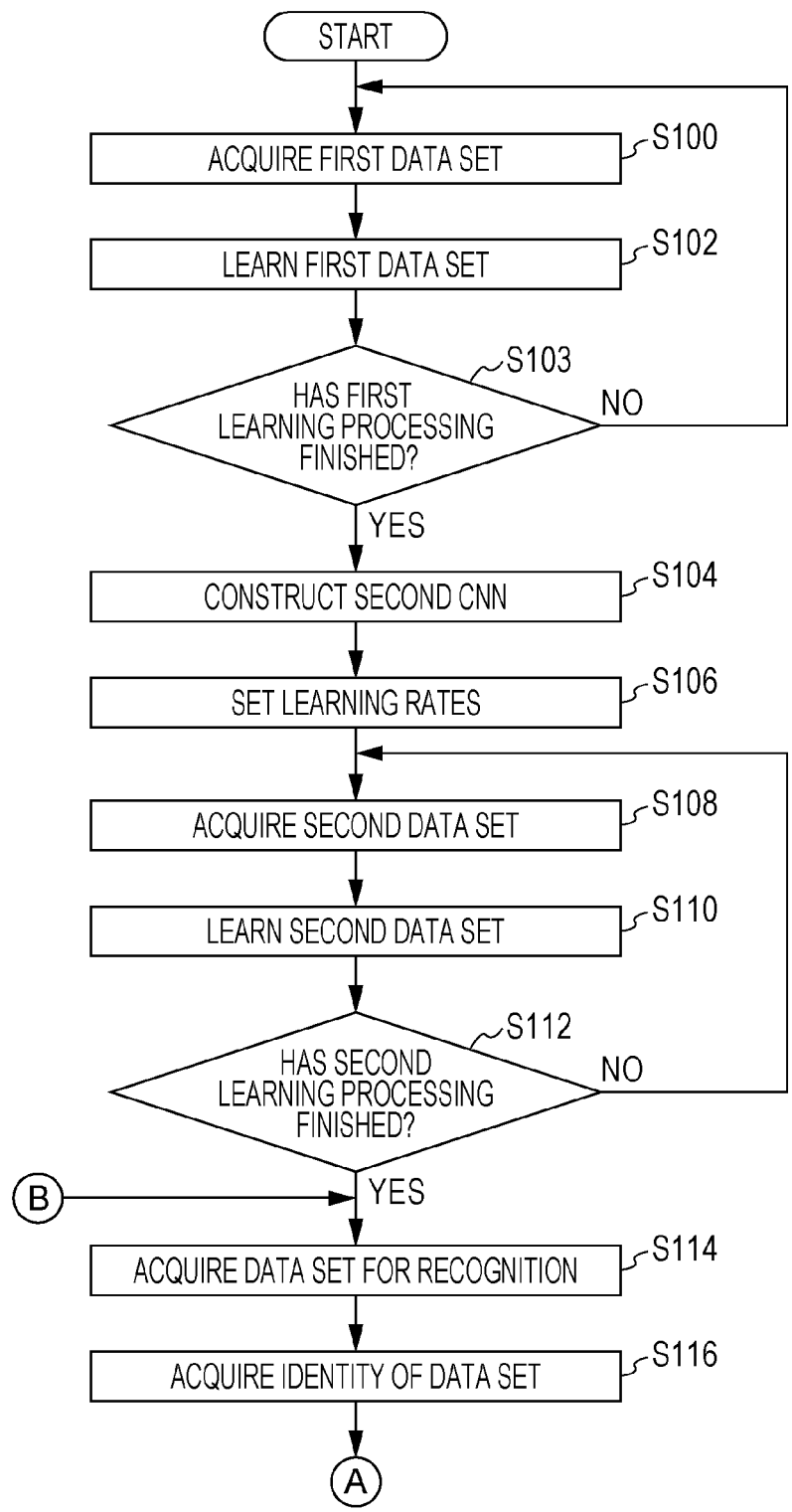

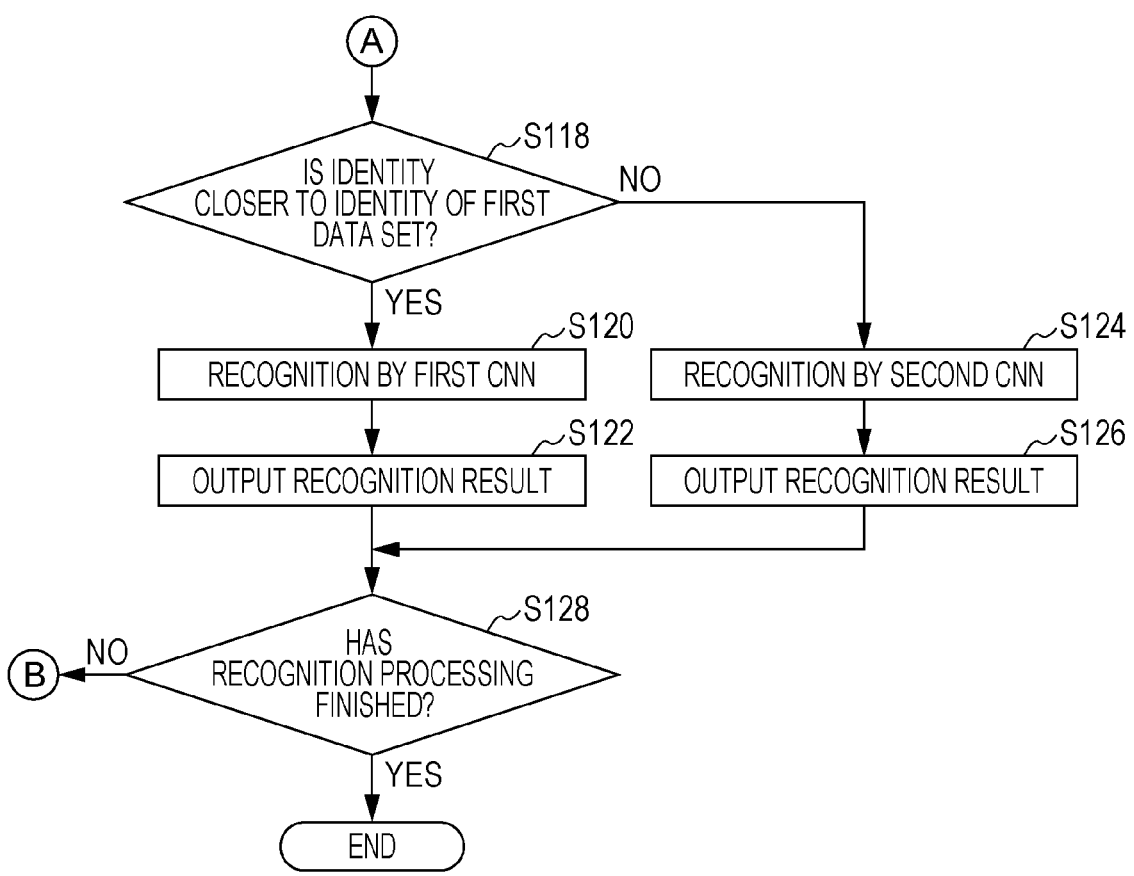

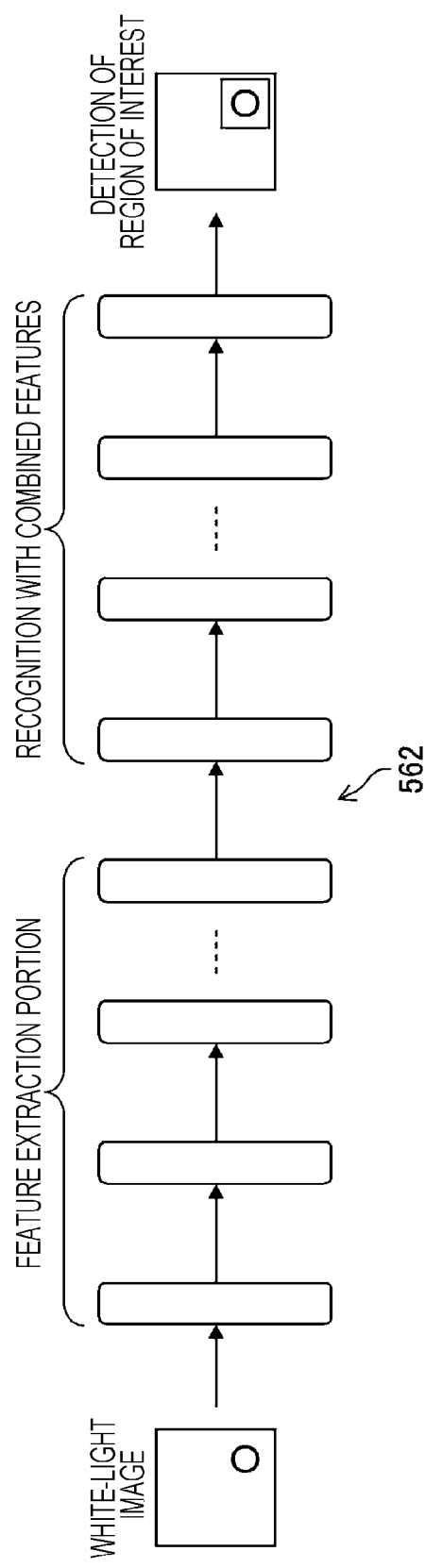
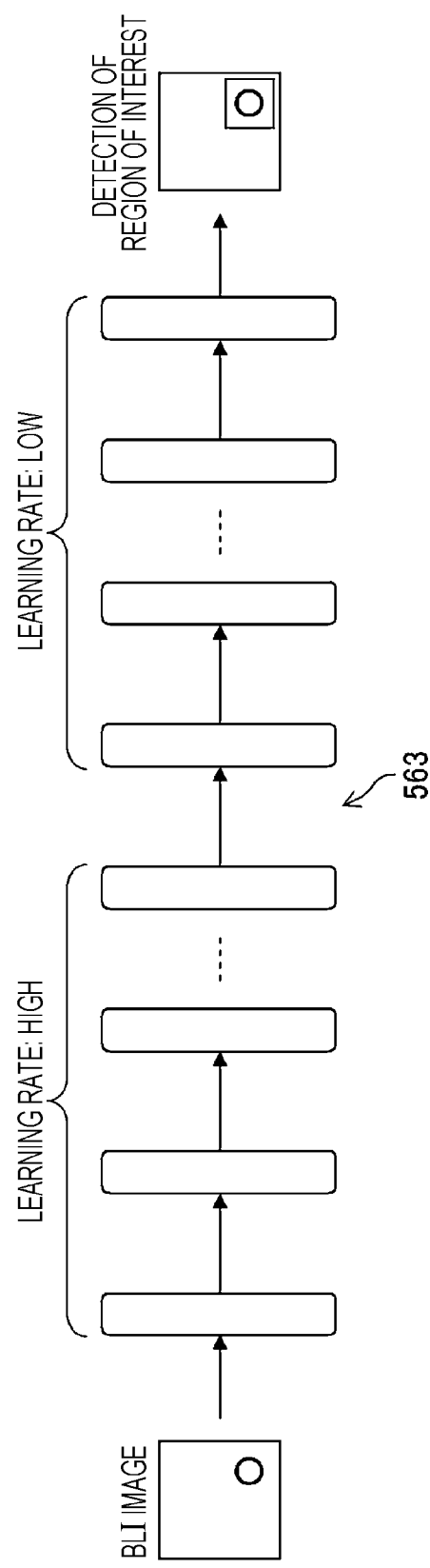

IMAGE PROCESSING METHOD AND IMAGE PROCESSING APPARATUS

CROSS-REFERENCE TO RELATED APPLICATIONS

The present application is a Continuation of PCT International Application No. PCT/JP2019/030255 filed on Aug. 1, 2019 claiming priority under 35 U.S.C. § 119(a) to Japanese Patent Application No. 2018-149388 filed on Aug. 8, 2018. Each of the above applications is hereby expressly incorporated by reference, in its entirety, into the present application.

BACKGROUND OF THE INVENTION

1. Field of the Invention

The present invention relates to an image processing method and an image processing apparatus, and specifically relates to an image processing method and an image processing apparatus for performing machine learning using a hierarchical network.

2. Description of the Related Art

In the field of machine learning, it is known that learning and recognition of various data including images are performed by using a hierarchical network. A hierarchical network is typically constituted by a plurality of layers for performing feature extraction, recognition, and so forth, and many parameters are set in accordance with the layer configuration. These parameters need to be optimized by learning a large amount of data.

Techniques for efficiently performing such learning have been proposed. For example, JP2017-16414A describes that a first learning step is performed and then a second learning step is performed with a higher learning rate, so that learning is completed in a short time.

SUMMARY OF THE INVENTION

The performance of a recognizer constructed through machine learning depends on a data set (an image group in the case of learning images) used in the learning. If the identity of data handled in recognition is different from that in learning, the accuracy of recognition decreases. To construct a recognizer that is accurate with respect to data having a different identity, learning may be performed for individual data identities. However, preparation of a large amount of data for individual identities may lead to an increase in development cost. Regarding this issue, the above-mentioned JP2017-16414A does not consider "how to learn images having different identities" at all.

As described above, it is difficult for the related art to efficiently learn images having different identities.

The present invention has been made in view of these circumstances, and it is an object of the present invention to provide an image processing method and an image processing apparatus that make it possible to efficiently learn images having different identities.

To achieve the above-described object, an image processing method according to a first aspect of the present invention is an image processing method for an image processing apparatus including a hierarchical network that receives an image and outputs a feature quantity of the image. The image processing method includes: executing first learning processing of inputting a first data set selected from a first image group to the hierarchical network and of causing the hierarchical network to learn the first data set; and executing, after execution of the first learning processing, second learning processing of inputting a second data set selected from a second image group having an identity different from an identity of the first image group to the hierarchical network and of causing the hierarchical network to learn the second data set, learning being performed in the second learning processing with a learning rate in a layer near an input side of the hierarchical network being set to be higher than a learning rate in a layer near an output side of the hierarchical network.

In learning and recognition using a hierarchical network, it is known that, based on experiences, a layer near the input functions as a feature extractor for extracting a feature that is necessary for recognition, and a layer near the output performs recognition by combining extracted features. Thus, performing learning by setting a higher learning rate to a layer near the input side of the hierarchical network than a learning rate in a layer near the output side in the second learning processing as in the first aspect corresponds to mainly relearning (adjusting) a feature extraction portion in data sets having different identities. Accordingly, the difference between data sets can be absorbed, and learning can be performed more efficiently than in the case of simply performing transfer learning (perform learning of the first data set and then perform learning of the second data set without adjusting the learning rate). As a result, high recognition accuracy can be acquired through learning with a small amount of data.

According to the first aspect, it is possible to efficiently learn images having different identities in this manner. In the first aspect and the following individual aspects, "different in identity between data sets" includes, for example, different in photographic subject, subject, imaging device (imaging apparatus), imaging condition, or details or characteristics of image processing or the like. In the first aspect and the following individual aspects, it is preferable that the first data set and the second data set be common in terms of a task (the processing targeted by learning and recognition, such as detection of a specific photographic subject or a region of interest).

In an image processing method according to a second aspect, in the first aspect, one or more images constituting the data set input in the first learning processing and one or more images constituting the data set input in the second learning processing are different from each other in an imaging device. The second aspect defines an aspect of "images having different identities". "Different in an imaging device" means that the modality (the classification or style of the device) is the same but the optical characteristic or the like (in a case where the imaging device is an endoscope, a processor, a scope, a light source, or a sensor) is different. For example, an endoscope apparatus and a computed tomography (CT) apparatus are different in modality.

In an image processing method according to a third aspect, in the first or second aspect, one or more images constituting the data set input in the first learning processing and one or more images constituting the data set input in the second learning processing are different from each other in image processing performed on the images. The third aspect defines another aspect of "images having different identities". The "image processing" may be, for example, processing of generating an image from data output by an imaging element (image sensor), processing of emphasizing or reducing a component of a specific frequency band, or processing of emphasizing or deemphasizing a specific target, and is not limited thereto.

In an image processing method according to a fourth aspect, in any one of the first to third aspects, one or more images constituting the data set input in the first learning processing and one or more images constituting the data set input in the second learning processing are different from each other in a portion of a subject captured in the images. The fourth aspect defines still another aspect of "images having different identities". "Different portions" may be, for example, different organs (or different portions in the same organ) in a case where the subject is a human body, and are not limited thereto. In addition, the subject is not limited to a human body.

In an image processing method according to a fifth aspect, in any one of the first to fourth aspects, one or more images constituting the data set input in the first learning processing and one or more images constituting the data set input in the second learning processing are different from each other in an attribute of a subject. The fifth aspect defines still another aspect of "images having different identities". The "attribute of a subject" may be, for example, the age, sex, or race in a case where the subject is a human body, and is not limited thereto.

In an image processing method according to a sixth aspect, in any one of the first to fifth aspects, a data set constituted by one or more medical images is input in the first learning processing and the second learning processing. In a case where medical images are used as a target of learning and recognition, it may be difficult to prepare a sufficient amount of images for individual identities. However, the image processing method according to the present invention makes it possible to efficiently learn images having different identities. Medical images are images depicting a result of imaging, measurement, or the like performed on a human body or the like for the purpose of diagnosis, treatment, measurement, or the like, and may be, for example, endoscopic images, ultrasound images, CT images, or magnetic resonance imaging (MRI) images.

In an image processing method according to a seventh aspect, in the sixth aspect, one or more endoscopic images constituting the data set input in the first learning processing and one or more endoscopic images constituting the data set input in the second learning processing are different from each other in a wavelength balance of observation light. In the case of acquiring an image by using an endoscope, the wavelength balance of observation light to be used varies according to the usage purpose of the image (an aspect of "different identities"). However, the amount of images to be acquired varies according to the usage purpose and thus it may be difficult to prepare a sufficient amount of images depending on observation light. However, according to the seventh aspect, learning can be efficiently performed even in such a case. "Different in a wavelength balance" means being different in the wavelength range of observation light and/or the correlation between the intensities of individual wavelength ranges in observation light, for example, white light and narrow-band light, or a combination of a plurality of types of narrow-band light in different wavelength ranges.

In an image processing method according to an eighth aspect, in any one of the first to seventh aspects, the hierarchical network is a convolutional neural network. The eighth aspect defines an example of a specific aspect of the hierarchical network.

In an image processing method according to a ninth aspect, in any one of the first to eighth aspects, in a case where an image input to the hierarchical network has a first size, and a size smaller than the first size is a second size, learning is performed in the second learning processing with the learning rate in the layer near the input side being set to be higher than the learning rate in the layer near the output side, the layer near the input side being a layer to which data having a size greater than the second size is input among layers constituting the hierarchical network, the layer near the output side being a layer to which data having a size smaller than or equal to the second size is input among the layers constituting the hierarchical network. The ninth aspect defines an aspect of the "layer near the input side" and the "layer near the output side" considering that the size of data to be input and output differs according to the layer configuration in the hierarchical network. In the ninth aspect, "data" includes not only an image input to the first layer but also a feature map or the like generated by the hierarchical network.

In an image processing method according to a tenth aspect, in any one of the first to ninth aspects, the hierarchical network has a convolutional layer and a fully connected layer, and learning is performed in the second learning processing with the learning rate in the layer near the input side being set to be higher than the learning rate in the layer near the output side, the layer near the input side being a layer not including the fully connected layer among layers constituting the hierarchical network, the layer near the output side being a layer including the fully connected layer among the layers constituting the hierarchical network. The tenth aspect defines another aspect of the "layer near the input side" and the "layer near the output side". The "layer including the fully connected layer" may include a layer other than the fully connected layer.

In an image processing method according to an eleventh aspect, in any one of the first to tenth aspects, the hierarchical network has a convolutional layer and a fully connected layer, and learning is performed in the second learning processing with the learning rate in the layer near the input side being set to be higher than the learning rate in the layer near the output side, the layer near the input side being a layer including the convolutional layer among layers constituting the hierarchical network, the layer near the output side being a layer not including the convolutional layer among the layers constituting the hierarchical network. The eleventh aspect defines still another aspect of the "layer near the input side" and the "layer near the output side".

In an image processing method according to a twelfth aspect, in any one of the first to eleventh aspects, the learning is performed in the first learning processing by using, as the first data set, a data set constituted by a number of images, the number of images being greater than in the second data set. It may be impossible to prepare a sufficient amount of data depending on the identity of images. Thus, in the twelfth aspect, the first learning processing is performed by using, as the first data set, a data set constituted by a number of images, the number of images being greater than in the second data set, and the second learning processing is performed by using the second data set constituted by a smaller number of images after execution of the first learning processing. As a result of performing the second learning processing after learning is sufficiently performed through the first learning processing using the first data set having a greater number of images, it is possible to efficiently learn the second data set having a smaller number of images.

An image processing method according to a thirteenth aspect, in any one of the first to twelfth aspects, includes performing data set acquisition processing of acquiring a data set constituted by one or more images, identity acquisition processing of acquiring an identity of the one or more images, and input control processing of inputting, in accordance with the identity, the acquired data set to at least one of a first recognizer that has a first learned model acquired through the first learning processing and that outputs a recognition result of the data set that is input or a second recognizer that has a second learned model acquired through the first learning processing and the second learning processing and that outputs a recognition result of the data set that is input. In the thirteenth aspect, highly accurate recognition can be performed by using the first and second recognizers constructed by using the image processing method according to any one of the first to twelfth aspects. For example, in a case where an image input for recognition has an identity identical or similar to that of the first image group, highly accurate recognition can be performed at least by inputting the image to the first recognizer. In this case, the image may be input to both the first and second recognizers and only a result from one of the recognizers may be output (displayed, recorded, or the like).

A program that causes the image processing apparatus or a computer to execute the image processing method according to the first to thirteenth aspects, and a non-transitory recording medium storing a computer-readable code of the program may be included in an aspect of the present invention.

To achieve the above-described object, an image processing apparatus according to a fourteenth aspect of the present invention includes: a learning data acquiring unit that acquires a first data set selected from a first image group and a second data set selected from a second image group having an identity different from an identity of the first image group; a hierarchical network that receives the first data set or the second data set and outputs a feature quantity; and a learning control unit that inputs the first data set or the second data set to the hierarchical network and causes the hierarchical network to learn the first data set or the second data set. The learning control unit executes first learning processing of inputting the first data set to the hierarchical network and of causing the hierarchical network to learn the first data set, and executes, after execution of the first learning processing, second learning processing of inputting the second data set to the hierarchical network and of causing the hierarchical network to learn the second data set, learning being performed in the second learning processing with a learning rate in a layer near an input side of the hierarchical network being set to be higher than a learning rate in a layer near an output side of the hierarchical network. According to the fourteenth aspect, it is possible to efficiently learn images having different identities as in the first aspect.

In an image processing apparatus according to a fifteenth aspect, in the fourteenth aspect, the learning is performed in the first learning processing by using, as the first data set, a data set constituted by a number of images, the number of images being greater than in the second data set. According to the fifteenth aspect, as in the twelfth aspect, it is possible to efficiently learn the second data set having a smaller number of images.

An image processing apparatus according to a sixteenth aspect, in the fourteenth or fifteenth aspect, includes: a data set acquiring unit that acquires a data set constituted by one or more images; an identity acquiring unit that acquires an identity of the data set; a first recognizer that has a first learned model acquired through the first learning processing and that outputs a recognition result of the data set that is input; a second recognizer that has a second learned model acquired through the first learning processing and the second learning processing and that outputs a recognition result of the data set that is input; and an input control unit that inputs, in accordance with the identity, the acquired data set to at least one of the first recognizer or the second recognizer. According to the sixteenth aspect, it is possible to perform recognition with high accuracy as in the thirteenth aspect.

The image processing apparatus according to the fourteenth to sixteenth aspects may further include configurations similar to those according to the second to eleventh aspects.

As described above, the image processing method and the image processing apparatus according to the present invention make it possible to efficiently learn images having different identities.

BRIEF DESCRIPTION OF THE DRAWINGS

FIGS. 2A and 2B are diagrams illustrating layer configurations of a convolutional neural network;

FIG. 3 is a diagram illustrating a state of convolutional processing using filters;

FIG. 6 is a flowchart illustrating an image processing method according to the first embodiment;

FIG. 7 is a flowchart (continued from FIG. 6) illustrating the image processing method according to the first embodiment;

FIGS. 8A and 8B are diagrams illustrating a state of first learning processing and second learning processing;

DESCRIPTION OF THE PREFERRED EMBODIMENTS

Hereinafter, an embodiment of an image processing method and an image processing apparatus according to the present invention will be described in detail with reference to the accompanying drawings.

First Embodiment

Configuration of Image Processing System

Figure 1:
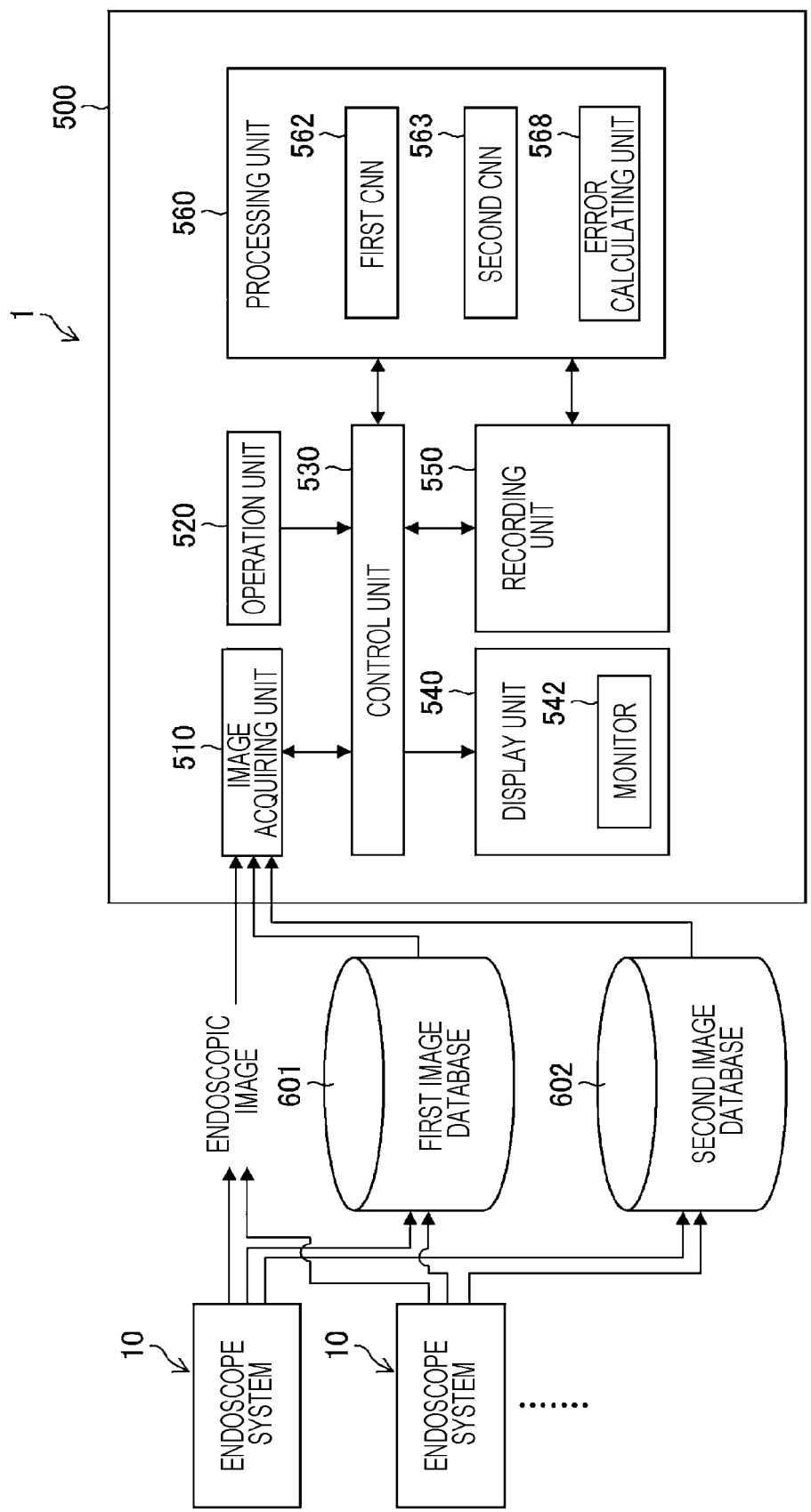
FIG. 1 is a diagram illustrating the configuration of an image processing system according to a first embodiment.

FIG. 1 is a block diagram illustrating the configuration of an image processing system 1 (an image processing apparatus) according to a first embodiment. The image processing system 1 includes an image processing apparatus 500 (an image processing apparatus) that performs learning processing and/or recognition processing based on an image captured by an endoscope inserted into a subject, one or more endoscope systems 10, a first image database 601, and a second image database 602.

First and Second Image Databases
Normal-Light Image and Special-Light Image

The first image database 601 and the second image database 602 are each constituted by a recording medium such as a hard disk, and endoscopic images acquired by the endoscope systems 10 are recorded therein. For example, a plurality of endoscopic images (medical images) captured by using normal light as observation light (first observation light) can be recorded in the first image database 601, and a plurality of endoscopic images captured by using observation light different from the normal light (second observation light, for example, special light) can be recorded in the second image database 602. That is, the plurality of normal-light images recorded in the first image database 601 correspond to an aspect of a "first image group" according to the present invention, whereas the plurality of special-light images recorded in the second image database 602 correspond to an aspect of a "second image group having an identity different from that of the first image group" according to the present invention. Hereinafter, special light (narrow-band light) for capturing a special-light image will be described as short-wavelength narrow-band light (blue narrow-band light), but the special light may be light having another wavelength, such as long-wavelength narrow-band light (red narrow-band light). Although in the above example a description has been given of a case where the first observation light and the second observation light are white light and narrow-band light, respectively, medical images such as endoscopic images acquired by using first narrow-band light and second narrow-band light having different wavelength ranges and/or intensities as observation light may be used.

Example of Data Having Different Identities

As well as endoscopic images different in the wavelength balance of observation light, such as the above-described normal-light images and special-light images, endoscopic images different in one or more of the imaging device, resolution, and image processing performed on the images may be recorded in the first image database 601 and the second image database 602. "Different in the imaging device" includes using scopes different from each other or endoscopes having different characteristics of light sources or optical systems or different performances of processors (the plurality of endoscope systems 10 may have different characteristics), and is not limited thereto. "Different in the image processing performed on the images" includes being different in whether or not processing of emphasizing or deemphasizing a specific region such as a region of interest or processing of emphasizing or reducing an influence of a specific wavelength component has been performed and/or the degree of the processing, and is not limited thereto. In addition to or instead of these pieces of data, images (endoscopic images) acquired by imaging different portions of subjects may be recorded in the first image database 601 and the second image database 602, or images (endoscopic images) of subjects having different attributes may be recorded therein. The "attributes of subjects" may be, for example, age, sex, race, and so forth, and are not limited thereto.

Difference in Number of Pieces of Data According to Data Acquisition Condition

In the case of performing observation or examination using an endoscope, a user often causes a monitor to display an image acquired by using normal light (white light) as observation light and checks the image. In some cases, an image is acquired by using special light such as narrow-band light as observation light depending on the purpose or situation of observation or examination (for example, the structure of a lesion is difficult to observe under normal light). However, special light is used as observation light less frequently than normal light, and thus the number of special-light images is significantly smaller than the number of normal-light images in many cases. In the case of performing learning and/or recognition of images in machine learning, it is necessary to perform learning and/or recognition of special-light images. However, if the number of pieces of data is small, the accuracy of learning and/or recognition may decrease compared with normal-light images. In view of this situation, the learning processing described below makes it possible to efficiently learn and/or recognize data having different identities in the first embodiment.

Correct Answer Data of Endoscopic Image

The first image database 601 and the second image database 602 are capable of storing, in addition to the above-described endoscopic images, "correct answer data" for identifying a region of interest in association with the images. For example, the first image database 601 stores a plurality of pieces of correct answer data respectively corresponding to a plurality of normal-light images, and the second image database 602 stores a plurality of pieces of correct answer data respectively corresponding to a plurality of special-light images. Preferably, correct answer data is a region of interest or a discrimination result designated for an endoscopic image by a medical doctor. Instead of or in addition to correct answer data of endoscopic images different in the wavelength balance of observation light, correct answer data about an imaging device, resolution, image processing performed on an image, or a portion (imaging portion) or attribute of a subject may be recorded.

Configuration of Image Processing Apparatus

An image acquiring unit 510 is constituted by an apparatus or the like that communicates with an external server, a database, and the like via a network, and acquires an endoscopic image and/or correct answer data to be used for learning and recognition from the first image database 601 or the second image database 602. The image acquiring unit 510 is capable of acquiring an endoscopic image also from an endoscope system, an in-hospital server, or the like connected to the image processing system 1 via a network that is not illustrated. An operation unit 520 includes input devices such as a keyboard and a mouse that are not illustrated, and a user is able to perform operations necessary for image acquisition and processing of learning, recognition, and the like via these devices. A control unit 530 reads various programs recorded in a recording unit 550 and controls the operation of the entire image processing system 1 in response to an instruction received from the operation unit 520. In addition, the control unit 530 back-propagates an error (loss) calculated by an error calculating unit 568, which will be described below, to a first convolutional neural network (CNN) 562 and/or a second CNN 563, thereby updating the weight parameters of these CNNs.

A display unit 540 includes a monitor 542 (a display apparatus) and displays an endoscopic image, a learning result, a recognition result, a processing condition setting screen, and so forth. The recording unit 550 is constituted by a read only memory (ROM), a random access memory (RAM), a hard disk, and the like, and stores data acquired by the image acquiring unit 510, a learning result and/or a recognition result or the like obtained by a processing unit 560. In addition, the recording unit 550 stores a program (including a program that causes the image processing system 1 to execute the image processing method according to the present invention) for performing learning and recognition of endoscopic images (medical images). The processing unit 560 includes the first CNN 562, the second CNN 563, and the error calculating unit 568 that calculates a loss (error) on the basis of the output (a recognition result) of these CNNs and the above-described "correct answer data".

First CNN and Second CNN

The image processing system 1 (the image processing apparatus 500) according to the first embodiment includes the first CNN 562 and the second CNN 563 each of which is a convolutional neural network (a hierarchical network). In a state in which first learning processing and second learning processing described below have been executed, the first CNN 562 is a network constructed through the first learning processing, and the second CNN 563 is a network constructed through the second learning processing that is performed by applying the state (the values of weight parameters or the like) of the first CNN 562 to a network having the same layer configuration as that of the first CNN 562. That is, the second CNN 563 is a CNN similar to the one constructed by performing second learning processing after first learning processing.

Layer Configurations of CNNs

The layer configurations of the first CNN 562 and the second CNN 563 will be described. Hereinafter a description will be given mainly of the first CNN 562, but a similar configuration is adoptable to the second CNN 563. In consideration of reflecting the weight parameters or the like of the first CNN 562 (a result of first learning processing) in the second CNN 563 (the details will be described below), it is preferable that the first CNN 562 and the second CNN 563 have the same layer configuration (the types, number, and order of layers, the number of nodes in each layer, and so forth).

FIGS. 2A and 2B are diagrams illustrating examples of the layer configuration of the first CNN 562. In the example illustrated in FIG. 2A, the first CNN 562 includes an input layer 562A, an intermediate layer 562B, and an output layer 562C. The input layer 562A receives an image selected from among the normal-light images stored in the first image database 601 and outputs a feature quantity. The intermediate layer 562B includes convolutional layers 564 and pooling layers 565, and receives the feature quantity output from the input layer 562A and calculates another feature quantity. These layers each have a structure in which a plurality of "nodes" are connected by "edges" and hold a plurality of weight parameters. The values of the weight parameters change as learning progresses. The first CNN 562 may include a fully connected layer 566 as in the example illustrated in FIG. 2B. The layer configuration of the first CNN 562 is not limited to the configuration in which the convolutional layers 564 and the pooling layers 565 are alternately arranged, and may include a plurality of consecutive convolutional layers 564 or pooling layers 565 (for example, convolutional layers 564). Alternatively, a plurality of consecutive fully connected layers 566 may be included.

Processing in Intermediate Layer

The intermediate layer 562B calculates a feature quantity through convolutional operation and pooling processing. The convolutional operation performed in the convolutional layer 564 is processing of acquiring a feature map through convolutional operation using a filter, and plays a role in feature extraction such as edge extraction from an image. As a result of the convolutional operation using a filter, one-channel (one) "feature map" is created for one filter. The size of the "feature map" is scaled down by convolution and is reduced as convolution is performed in each layer. The pooling processing performed in the pooling layer 565 is processing of reducing (or enlarging) the feature map output through the convolutional operation to create a new feature map, and plays a role in giving robustness so that the extracted feature is not affected by parallel movement or the like. The intermediate layer 562B can be constituted by one or a plurality of layers that perform these processing operations.

FIG. 3 is a schematic diagram illustrating an example configuration of the intermediate layer 562B of the first CNN 562 illustrated in FIGS. 2A and 2B. In the first convolutional layer of the intermediate layer 562B, convolutional operation of an image set for learning (for recognition in the case of recognition) and a filter $F_1$ is performed. The image set includes N (N-channel) images each having an image size in which the height is represented by H and the width is represented by W. In the case of inputting normal-light images, the images constituting a data set are three-channel images of red (R), green (G), and blue (B). The filter $F_1$ convoluted with this image set has a filter size of 5×5×N in the case of the filter having size 5 (5×5), for example, because the image set has N channels (N images). As a result of convolutional operation using the filter $F_1$, one-channel (one) "feature map" is created for one filter $F_1$. A filter $F_2$ used in the second convolutional layer has a filter size of 3×3×M in the case of the filter having size 3 (3×3), for example.

As in the first convolutional layer, in the second to n-th convolutional layers, convolutional operations using filters $F_2$ to $F_n$ are performed, respectively. The size of the "feature map" in the n-th convolutional layer is smaller than the size of the "feature map" in the second convolutional layer because scaling-down is performed in the convolutional layers or pooling layers in the preceding stages.

Among the layers of the intermediate layer 562B, lower-order feature extraction (extraction of edges or the like) is performed in a convolutional layer near the input side, and higher-order feature extraction (extraction of features about the shape, structure, and the like of an object) is performed near the output side (see FIG. 8A). In the case of performing segmentation, scaling-up is performed in a convolutional layer in a latter-half portion, and the "feature map" having the same size as the input image set can be obtained in the last convolutional layer. On the other hand, in the case of performing object detection, it is sufficient to output position information and thus scaling-up is not necessary. In the first embodiment, in view of these points, second learning processing is performed by using a learning rate that is different between "the layer near the input side" and "the layer near the output side" (see FIG. 8B, the details will be described below).

The intermediate layer 562B may include a layer for performing batch normalization in addition to the convolutional layers 564 and the pooling layers 565. Batch normalization processing is the processing of normalizing a data distribution in units of mini batches for performing learning, and plays a role in quickly performing learning, reducing dependency on an initial value, suppressing overtraining, and so forth.

Processing in Output Layer

The output layer 562C is a layer that detects the position of a region of interest depicted in an input image (a normal-light image, a special-light image) on the basis of the feature quantity output from the intermediate layer 562B and outputs the result thereof. In the case of performing segmentation, the output layer 562C grasps the position of a region of interest depicted in an image in the pixel level by using the "feature map" acquired from the intermediate layer 562B. That is, the output layer 562C is capable of detecting, for each pixel of an endoscopic image, whether or not the pixel belongs to the region of interest, and outputting the detection result. On the other hand, in the case of performing object detection, determination in the pixel level is not necessary, and the output layer 562C outputs position information of a target.

The output layer 562C may execute discrimination of a lesion and output a discrimination result. For example, the output layer 562C may classify an endoscopic image into one of three categories "neoplastic", "non-neoplastic", and "others", and may output, as a discrimination result, one of three scores corresponding to "neoplastic", "non-neoplastic", and "others" (the sum of the three scores is 100%), or may output a classification result in a case where the endoscopic image can be clearly classified from the three scores. In the case of outputting a discrimination result, it is preferable that the intermediate layer 562B have a fully connected layer as the last one or plural layers (see FIG. 2B).

Configuration of Endoscope System

Figure 4:
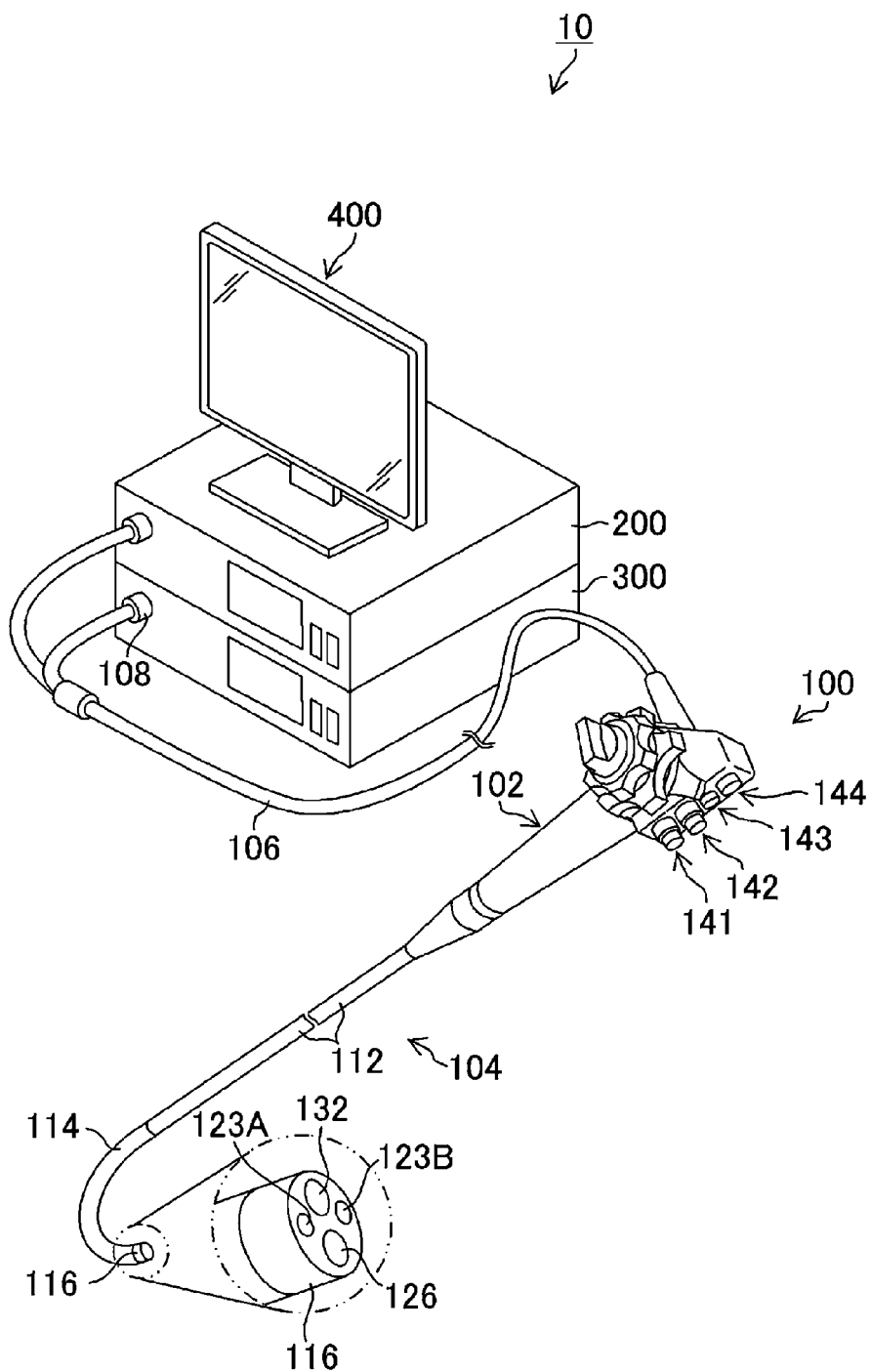
FIG. 4 is a diagram illustrating the configuration of an endoscope system.
Figure 5:
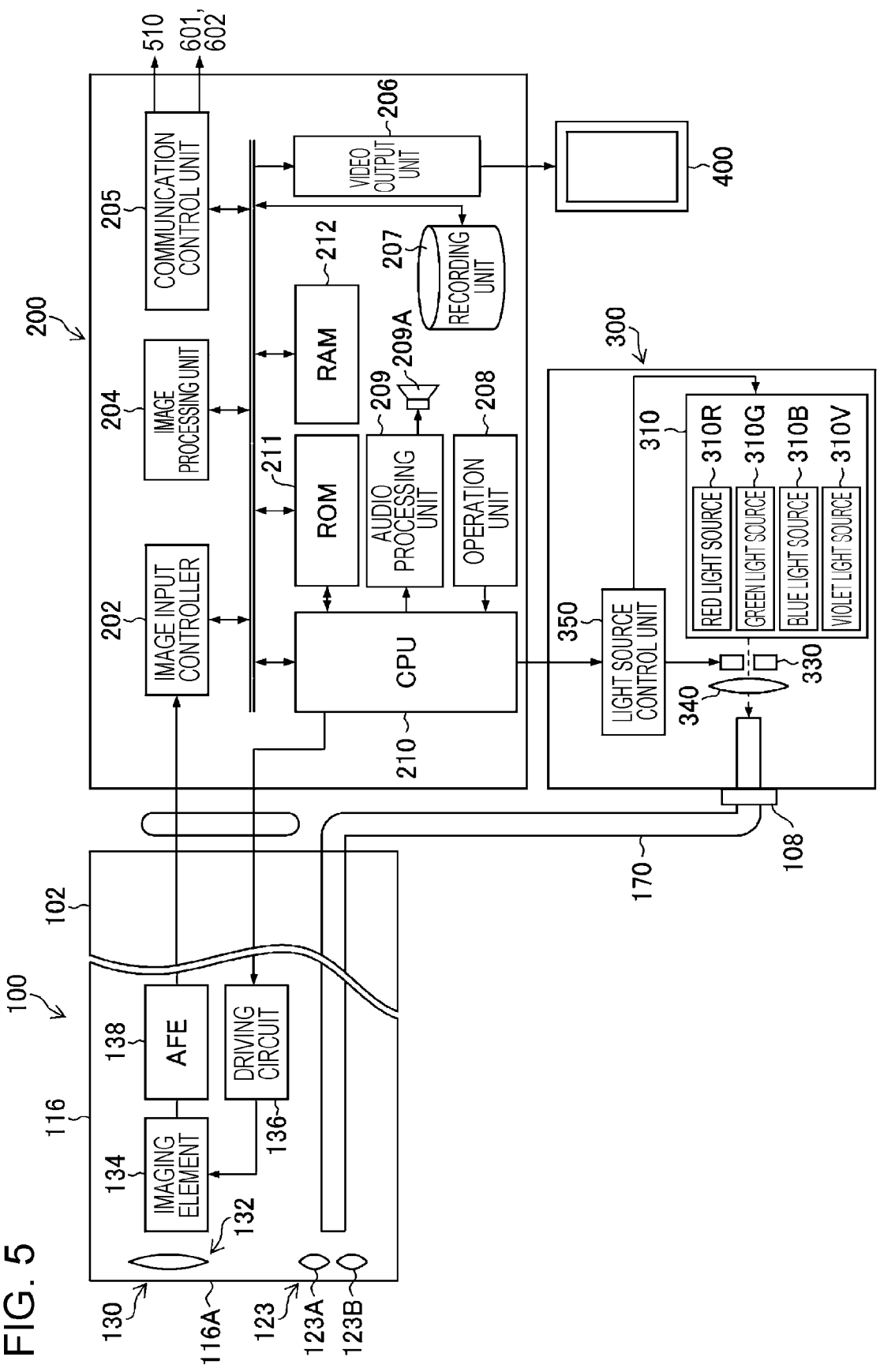
FIG. 5 is another diagram illustrating the configuration of the endoscope system.

FIG. 4 is an external appearance diagram of the endoscope system 10 (an image processing apparatus, a diagnosis assistance apparatus, an endoscope system, a medical image processing apparatus), and FIG. 5 is a block diagram illustrating the configuration of a main part of the endoscope system 10. As illustrated in FIGS. 4 and 5, the endoscope system 10 is constituted by an endoscope main body 100 (an endoscope), a processor 200 (a processor, an image processing apparatus, a medical image processing apparatus), a light source apparatus 300, and a monitor 400 (a display apparatus).

Configuration of Endoscope Main Body

The endoscope main body 100 includes a handheld operation section 102 and an insertion section 104 that communicates with the handheld operation section 102. An operator (a user) operates the handheld operation section 102 while grasping it and inserts the insertion section 104 into a body of a subject (a living body) to perform observation. The handheld operation section 102 is provided with an air/water supply button 141, a suction button 142, a function button 143 to which various functions are allocated, and an imaging button 144 for receiving an imaging instruction operation (a still image, a moving image). The insertion section 104 is constituted by a soft part 112, a bending part 114, and a tip rigid part 116, which are arranged in this order from the handheld operation section 102 side. That is, the bending part 114 is connected to a base end side of the tip rigid part 116, and the soft part 112 is connected to a base end side of the bending part 114. The handheld operation section 102 is connected to a base end side of the insertion section 104. The user is able to change the orientation of the tip rigid part 116 in an up, down, left, or right direction by causing the bending part 114 to bend by operating the handheld operation section 102. The tip rigid part 116 is provided with an imaging optical system 130, an illumination unit 123, a forceps port 126, and so forth (see FIG. 4 and FIG. 5).

During observation or treatment, an operation of an operation unit 208 (see FIG. 5) enables white light and/or narrow-band light (one or more of red narrow-band light, green narrow-band light, blue narrow-band light, and violet narrow-band light) to be radiated from illumination lenses 123A and 123B of the illumination unit 123. In addition, an operation of the air/water supply button 141 enables washing water to be ejected from a water supply nozzle that is not illustrated, so that an imaging lens 132 (an imaging lens, an imaging unit) of the imaging optical system 130 and the illumination lenses 123A and 123B can be washed. The forceps port 126 opening in the tip rigid part 116 communicates with a pipe line that is not illustrated, so that a treatment tool that is not illustrated and is for extirpating a tumor or the like can be inserted into the pipe line and necessary treatment can be given to a subject by moving the treatment tool forward or backward as appropriate.

As illustrated in FIG. 4 and FIG. 5, the imaging lens 132 (an imaging unit) is disposed on a distal-end-side surface 116A of the tip rigid part 116. An imaging element 134 (an imaging element, an imaging unit) of a complementary metal-oxide semiconductor (CMOS) type, a driving circuit 136, and an analog front end (AFE) 138 are disposed behind the imaging lens 132, and these elements output an image signal. The imaging element 134 is a color imaging element and includes a plurality of pixels constituted by a plurality of light-receiving elements arranged in a matrix (arranged two-dimensionally) in a specific pattern arrangement (Bayer arrangement, X-Trans (registered trademark) arrangement, honeycomb arrangement, or the like). Each pixel of the imaging element 134 includes a microlens, a red (R), green (G), or blue (B) color filter, and a photoelectric conversion unit (a photodiode or the like). The imaging optical system 130 is capable of generating a color image from pixel signals of three colors, red, green, and blue, and is also capable of generating an image from pixel signals of any one or two colors among red, green, and blue. In the first embodiment, a description will be given of a case where the imaging element 134 is a CMOS-type imaging element, but the imaging element 134 may be of a charge coupled device (CCD) type. Each pixel of the imaging element 134 may further include a violet color filter corresponding to a violet light source 310V and/or an infrared filter corresponding to an infrared light source.

An optical image of a subject (a tumor portion, a lesion portion) is formed on a light-receiving surface (an imaging surface) of the imaging element 134 by the imaging lens 132, converted into an electric signal, output to the processor 200 through a signal cable that is not illustrated, and converted into a video signal. Accordingly, an observation image is displayed on the monitor 400, which is connected to the processor 200.

The illumination lenses 123A and 123B of the illumination unit 123 are provided next to the imaging lens 132 on the distal-end-side surface 116A of the tip rigid part 116. An emission end of a light guide 170, which will be described below, is disposed behind the illumination lenses 123A and 123B. The light guide 170 extends through the insertion section 104, the handheld operation section 102, and a universal cable 106, and an incidence end of the light guide 170 is located in a light guide connector 108.

Configuration of Light Source Apparatus

As illustrated in FIG. 5, the light source apparatus 300 is constituted by a light source 310 for illumination, a diaphragm 330, a condenser lens 340, a light source control unit 350, and so forth, and causes observation light to enter the light guide 170. The light source 310 includes a red light source 310R, a green light source 310G, a blue light source 310B, and the violet light source 310V that radiate red narrow-band light, green narrow-band light, blue narrow-band light, and violet narrow-band light, respectively, and is capable of radiating red narrow-band light, green narrow-band light, blue narrow-band light, and violet narrow-band light. The illuminance of observation light from the light source 310 is controlled by the light source control unit 350, which is capable of decreasing the illuminance of observation light or stopping illumination as necessary.

The light source 310 is capable of emitting red narrow-band light, green narrow-band light, blue narrow-band light, and violet narrow-band light in any combination. For example, the light source 310 is capable of simultaneously emitting red narrow-band light, green narrow-band light, blue narrow-band light, and violet narrow-band light to radiate white light (normal light) as observation light, and is also capable of emitting any one or two of red narrow-band light, green narrow-band light, blue narrow-band light, and violet narrow-band light to radiate narrow-band light (special light). The light source 310 may further include an infrared light source that radiates infrared light (an example of narrow-band light). Alternatively, with use of a light source that radiates white light and a filter that allows white light and each narrow-band light to pass therethrough, white light or narrow-band light may be radiated as observation light.

Wavelength Range of Light Source

The light source 310 may be a light source that generates light in a white range or light in a plurality of wavelength ranges as the light in the white range, or may be a light source that generates light in a specific wavelength range narrower than the white wavelength range. The specific wavelength range may be a blue range or green range in a visible range, or may be a red range in the visible range. In a case where the specific wavelength range is the blue range or green range in the visible range, the specific wavelength range may include a wavelength range of 390 nm or more and 450 nm or less or a wavelength range of 530 nm or more and 550 nm or less, and the light in the specific wavelength range may have a peak wavelength in the wavelength range of 390 nm or more and 450 nm or less or the wavelength range of 530 nm or more and 550 nm or less. In a case where the specific wavelength range is the red range in the visible range, the specific wavelength range may include a wavelength range of 585 nm or more and 615 nm or less or a wavelength range of 610 nm or more and 730 nm or less, and the light in the specific wavelength range may have a peak wavelength in the wavelength range of 585 nm or more and 615 nm or less or the wavelength range of 610 nm or more and 730 nm or less.

The above-described specific wavelength range may include a wavelength range in which a light absorption coefficient is different between oxyhemoglobin and deoxyhemoglobin, and may have a peak wavelength in the wavelength range in which the light absorption coefficient is different between oxyhemoglobin and deoxyhemoglobin. In this case, the specific wavelength range may include a wavelength range of 400±10 nm, a wavelength range of 440±10 nm, a wavelength range of 470±10 nm, or a wavelength range of 600 nm or more and 750 nm, and the light in the specific wavelength range may have a peak wavelength in the wavelength range of 400±10 nm, the wavelength range of 440±10 nm, the wavelength range of 470±10 nm, or the wavelength range of 600 nm or more and 750 nm or less.

The wavelength range of the light generated by the light source 310 may include a wavelength range of 790 nm or more and 820 nm or less or a wavelength range of 905 nm or more and 970 nm or less, and the light generated by the light source 310 may have a peak wavelength in the wavelength range of 790 nm or more and 820 nm or less or the wavelength range of 905 nm or more and 970 nm or less.

Alternatively, the light source 310 may include a light source that radiates excitation light whose peak is 390 nm or more and 470 nm or less. In this case, a medical image (an inside-of-living-body image) having information about fluorescence emitted by a fluorescent substance in a subject (a living body) can be acquired. In the case of acquiring a fluorescence image, a pigment for a fluorescence method (fluorescein, acridine orange, or the like) may be used.

It is preferable that the type of the light source 310 (a laser light source, a xenon light source, a light-emitting diode (LED) light source, or the like), the wavelength of the light source 310, the presence or absence of a filter for the light source 310, and so forth be determined in accordance with the type of photographic subject, the purpose of observation, or the like. It is also preferable that, during observation, the wavelengths of observation light be combined and/or switched in accordance with the type of photographic subject, the purpose of observation, or the like. In the case of switching the wavelength, for example, a disc-shaped filter (a rotary color filter) that is disposed in front of the light source and that is provided with a filter for transmitting or blocking light of a specific wavelength may be rotated to switch the wavelength of light to be radiated.

The imaging element used to carry out the present invention is not limited to a color imaging element in which color filters are disposed for the individual pixels, such as the imaging element 134, and may be a monochrome imaging element. In the case of using a monochrome imaging element, imaging can be performed in a frame sequential (color sequential) manner by sequentially switching the wavelength of observation light. For example, the wavelength of outgoing observation light may be sequentially switched among violet, blue, green, and red, or wide-band light (white light) may be radiated and the wavelength of outgoing observation light may be switched by using a rotary color filter (red, green, blue, violet, and the like). Alternatively, one or a plurality of types of narrow-band light (green, blue, violet, and the like) may be radiated and the wavelength of outgoing observation light may be switched by using a rotary color filter (green, blue, violet, and the like). The narrow-band light may be infrared light of two or more different wavelengths (first narrow-band light and second narrow-band light).

As a result of connecting the light guide connector 108 (see FIG. 4) to the light source apparatus 300, observation light radiated by the light source apparatus 300 is transmitted through the light guide 170 to the illumination lenses 123A and 123B and is radiated from the illumination lenses 123A and 123B to an observation range.

Configuration of Processor

The configuration of the processor 200 will be described with reference to FIG. 5. In the processor 200, an image input controller 202 receives an image signal output from the endoscope main body 100, an image processing unit 204 performs necessary image processing thereon, and a video output unit 206 outputs a resulting image signal. Accordingly, an observation image (an inside-of-living-body image) is displayed on the monitor 400 (a display apparatus). These processing operations are performed under control by a central processing unit (CPU) 210. A communication control unit 205 controls communication with a hospital information system (HIS) or a hospital local area network (LAN) that are not illustrated, the above-described image acquiring unit 510, first image database 601, second image database 602, and the like, or an external system or a network. In a recording unit 207, an image of a subject (an endoscopic image, a medical image), information indicating a result of detection and/or classification of a region of interest, and the like are recorded. An audio processing unit 209 outputs a message (sound) or the like based on the result of detection and/or classification of the region of interest from a speaker 209A under control by the CPU 210 and the image processing unit 204.

A read only memory (ROM) 211 is a nonvolatile storage element (a non-transitory recording medium) and stores a computer-readable code of a program that causes the CPU 210 and/or the image processing unit 204 (an image processing apparatus, a computer) to execute various image processing methods. A random access memory (RAM) 212 is a storage element for temporary storage in various processing operations and can be used as a buffer when acquiring an image.

Functions of Image Processing Unit

The image processing unit 204 is capable of performing calculation of a feature quantity, processing of emphasizing or reducing a component of a specific frequency band, processing of emphasizing or deemphasizing a specific target (a region of interest, blood vessels at a desired depth, or the like), and so forth. In addition, the image processing unit 204 may include a special-light image acquiring unit that acquires a special-light image having information about a specific wavelength range on the basis of a normal-light image that is acquired by radiating light in the white range or light in a plurality of wavelength ranges as the light in the white range. In this case, a signal in the specific wavelength range can be acquired through computation based on color information of RGB (R: red, G: green, B: blue) or CMY (C: cyan, M: magenta, Y: yellow) included in the normal-light image. In addition, the image processing unit 204 may include a feature quantity image generating unit that generates a feature quantity image through computation based on at least one of a normal-light image that is acquired by radiating light in the white range or light in a plurality of wavelength ranges as the light in the white range or a special-light image that is acquired by radiating light in a specific wavelength range, and may acquire and display the feature quantity image as a medical image. The processing operations using these functions are performed under control by the CPU 210.

Acquisition of "Images Having Different Identities" in Image Processing System

In the image processing system 1 having the above-described configuration, "images having different identities" may be acquired by using one endoscope system 10 while changing an imaging condition, an image processing condition, or the like, or may be acquired by using a plurality of endoscope systems 10. The plurality of endoscope systems 10 may include those having different system characteristics, imaging conditions, or the like. Alternatively, the image acquiring unit 510 or the like may acquire data from an external system.

Implementation of Functions by Various Processors

The above-described functions of the image acquiring unit 510, the control unit 530, the processing unit 560 (the first CNN 562, the second CNN 563, and the error calculating unit 568), and the image processing unit 204 can be implemented by using various types of processors and a recording medium. The various types of processors include, for example, a central processing unit (CPU) which is a general-purpose processor that executes software (program) to implement various functions. Also, the various types of processors include a graphics processing unit (GPU) which is a processor dedicated to image processing, and a programmable logic device (PLD) which is a processor whose circuit configuration is changeable after manufacturing, such as a field programmable gate array (FPGA). In the case of performing learning and recognition of images as in the present invention, the configuration using a GPU is effective. Furthermore, the various types of processors include a dedicated electric circuit which is a processor having a circuit configuration designed exclusively for executing specific processing, such as an application specific integrated circuit (ASIC).

The function of each unit may be implemented by one processor or may be implemented by a plurality of processors of the same type or different types (for example, a combination of a plurality of FPGAs, a combination of a CPU and an FPGA, or a combination of a CPU and a GPU). A plurality of functions may be implemented by one processor. A first example of implementing a plurality of functions by one processor is that a combination of one or more CPUs and software constitute one processor and the one processor implements the plurality of functions, as represented by a computer. A second example is that a processor that implements the functions of an entire system by one integrated circuit (IC) chip is used, as represented by a system on chip (SoC). In this way, various functions are configured as a hardware structure by using one or more of the above-described various types of processors. Furthermore, the hardware structure of the various types of processors is, more specifically, electric circuitry formed by combining circuit elements such as semiconductor elements.

When the above-described processor or electric circuitry executes the software (program), a processor (computer)-readable code of the software to be executed is stored in a non-transitory recording medium, such as a read only memory (ROM), and the processor refers to the software. The software stored in the non-transitory recording medium includes a program for executing the image processing method according to the present invention. The code may be recorded on a non-transitory recording medium, such as a magneto-optical recording device of various types or a semiconductor memory, instead of the ROM. In the processing using the software, a random access memory (RAM) may be used as a transitory storage region, for example, and data stored in an electrically erasable and programmable read only memory (EEPROM) that is not illustrated can be referred to, for example.

Image Processing Method

An image processing method in the image processing system 1 having the above-described configuration will be described. FIGS. 6 and 7 are flowcharts illustrating the procedure of an image processing method according to the first embodiment. A user is able to provide an instruction to execute image processing or designate a necessary condition for the execution via the operation unit 520, and the display unit 540 is able to display a screen when the instruction is provided and display the process and result of learning processing and/or recognition processing on the monitor 542.

First Learning Processing

The image acquiring unit 510 (a learning data acquiring unit) acquires a first data set selected from the image group of normal-light images (white-light images) recorded in the first image database 601 (step S100: first learning processing). The first data set may be a data set constituted by a plurality of mini batches. In this case, in the first CNN 562, a data distribution is normalized in units of mini batches for performing learning (batch normalization processing). The acquisition of the first data set may be performed in response to an input of an instruction from a user via the operation unit 520.

The image acquiring unit 510 inputs the acquired first data set to the input layer 562A of the first CNN 562 (step S102: first learning processing). The first CNN 562 calculates a feature map through convolutional operation or the like in the intermediate layer 562B having the above-described configuration (step S102: first learning processing). The output layer 562C detects, using the "feature map" acquired from the intermediate layer 562B, whether or not each pixel of an endoscopic image belongs to a region of interest, and outputs a detection result (it may be a discrimination result as described above) (step S102: First learning processing). The error calculating unit 568 compares the result output from the output layer 562C with a correct answer for the first data set to calculate a loss (error), and updates the weight parameters in the intermediate layer 562B from an output-side layer toward an input-side layer so as to reduce the loss (step S102: first learning processing, error back propagation).

The control unit 530 and the first CNN 562 repeat the above-described first learning processing until an affirmative determination is made in step S103. If a negative determination is made, the process returns to step S100. An affirmative determination can be made in step S103, for example, if learning of the data set has been repeated a designated number of times or if the error has converged. The first learning processing by the image acquiring unit 510, the first CNN 562, and the error calculating unit 568 is performed under control by the control unit 530 (a learning control unit).

In a case where the number of images is different between the first data set and the second data set, it is preferable in the first learning processing to perform learning by using, as the first data set, a data set constituted by a number of images, the number of images being greater than in the second data set. For example, in the case of performing learning using white-light images and learning using short-wavelength narrow-band-light images such as BLI images, it may be impossible to prepare as many short-wavelength narrow-band-light images as white-light images. In this case, it is preferable to perform first learning processing by using, as the first data set, a data set constituted by a number of white-light images greater than a number of short-wavelength narrow-band-light images constituting a data set (second data set), and perform second learning processing by using the second data set constituted by a smaller number of images (short-wavelength narrow-band-light images) after the execution of the first learning processing. Such learning makes it possible to perform second learning processing in a state in which learning has sufficiently been performed through the first learning processing using the first data set having a greater number of images, and learning can be efficiently performed using the second data set having a smaller number of images.

Second Learning Processing
Construction of Second CNN

The control unit 530 reflects the weight parameters of the first CNN 562 (the result of the above-described first learning processing) in the second CNN 563 to construct the second CNN 563 (step S104: second learning processing, CNN construction processing). Accordingly, the second CNN 563 is brought into a state in which the first learning processing has been performed.

Setting of Learning Rates

The control unit 530 and the second CNN 563 set the learning rates in the individual layers of the second CNN 563 (step S106: second learning processing). At this time, a high learning rate is set to a layer near the input side of the second CNN 563, and a low learning rate is set to a layer near the output side (see FIG. 8B). In learning and recognition using a hierarchical network, it is known that, based on experiences, a layer near the input functions as a feature extractor for extracting a feature that is necessary for recognition, and a layer near the output performs recognition by combining extracted features. Thus, performing learning by setting a higher learning rate to a layer near the input side of the second CNN 563 than a learning rate in a layer near the output side in the second learning processing as in the first embodiment corresponds to mainly relearning (adjusting) a feature extraction portion in data sets having different identities. Accordingly, the difference between data sets can be absorbed, and learning can be performed more efficiently than in the case of simply performing transfer learning (performing learning of the first data set and then performing learning of the second data set without adjusting the learning rate).

In the first embodiment, the first data set is constituted by white-light images and the second data set is constituted by BLI images. These types of images are significantly different from each other in the entire tint but are common to each other in the characteristic of a detection target (a region of interest) (protruded compared to surroundings, different from surroundings in hue, or the like). Thus, by adjusting only the feature extraction portion of the first CNN 562 (hierarchical network) learned using white-light images for BLI images (setting of the learning rates in second learning processing), the same method for combining features can be used in the layers after the feature extraction portion. In the first embodiment, with use of a model that has learned using white-light images, high recognition accuracy is obtained even in the case of a small amount of data such as BLI images.

Examples of Setting of Learning Rates

Hereinafter, examples of setting of learning rates in the second CNN 563 will be described.

Example 1: Setting Based on Data Size

Figure 9:
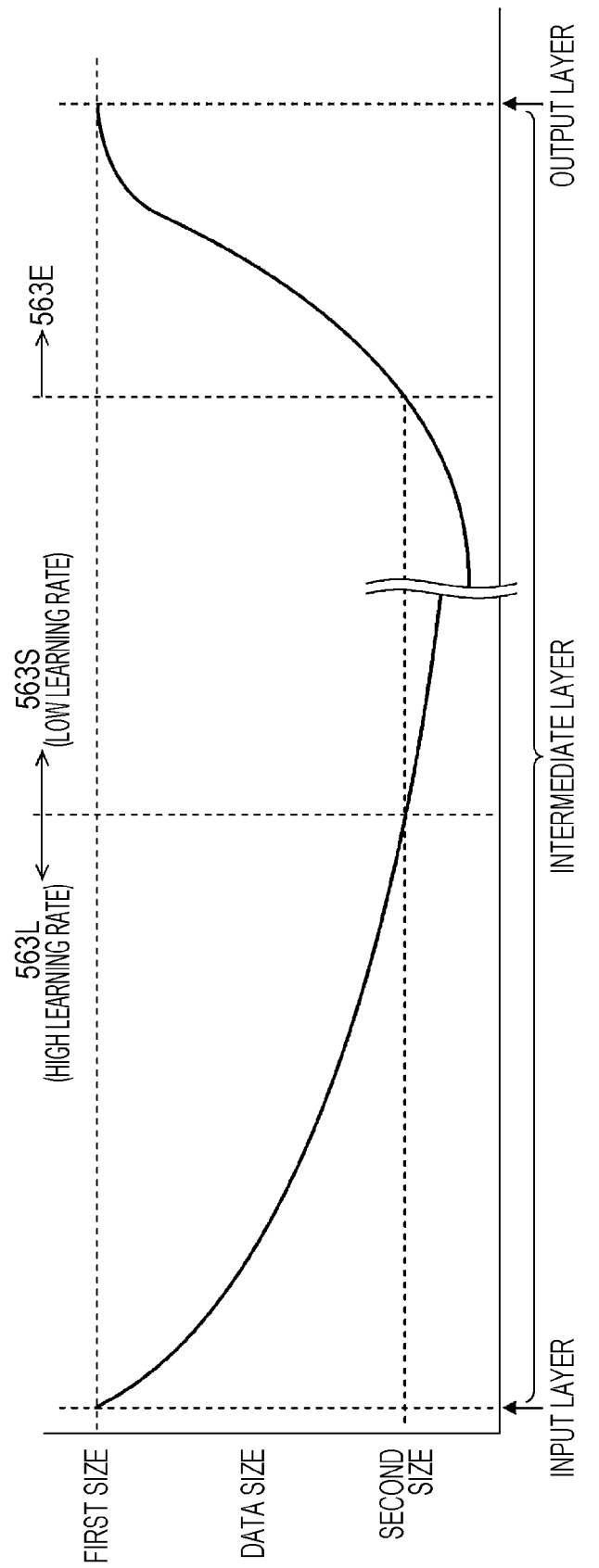
FIG. 9 is a diagram illustrating a state of defining an input-side layer and an output-side layer in accordance with a data size.

FIG. 9 is a conceptual diagram illustrating a state in which the second CNN 563 is divided into "layers near the input side" and "layers near the output side" on the basis of the size of data input to each layer. FIG. 9 illustrates a state in which, when the size of an image input to the second CNN 563 (hierarchical network) is a first size and a size smaller than the first size is a second size, a layer to which data having a size greater than the second size is input (a layer included in a region 563L) among the layers constituting the second CNN 563 is regarded as a "layer near the input side", and a layer to which data having a size smaller than or equal to the second size is input (a layer included in a region 563S) is regarded as a layer near the output side. The curve in the figure represents a state in which the data size is changed by convolutional processing in an intermediate layer 563B.

The control unit 530 and the second CNN 563 set the learning rate in a layer included in the region 563L to be higher than the learning rate in a layer included in the region 563S. In a case where the first CNN 562 and the second CNN 563 are CNNs that perform segmentation, scaling-up is performed to increase the data size in the convolutional layer in the latter half portion (output side) of the intermediate layers 562B and 563B as described above. However, it is not necessary to increase the learning rate in a layer included in a region 563E in which the data size exceeds the second size again as a result of scaling-up. In a case where the first CNN 562 and the second CNN 563 perform object detection, the above-described scaling-up is not necessary.

Example 2: Setting Based on Presence or Absence of Fully Connected Layer

Figure 10A:
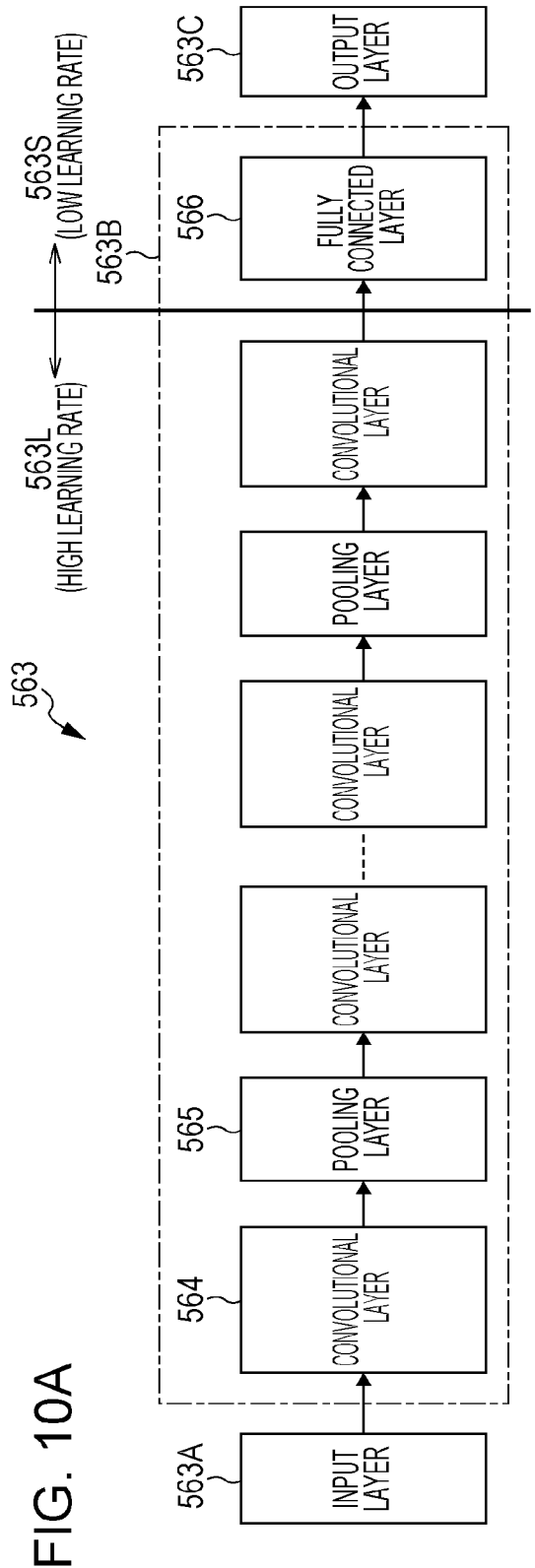
FIGS. 10A and 10B are diagrams illustrating states of defining an input-side layer and an output-side layer in accordance with the presence or absence of a fully-connected layer.
Figure 10B:
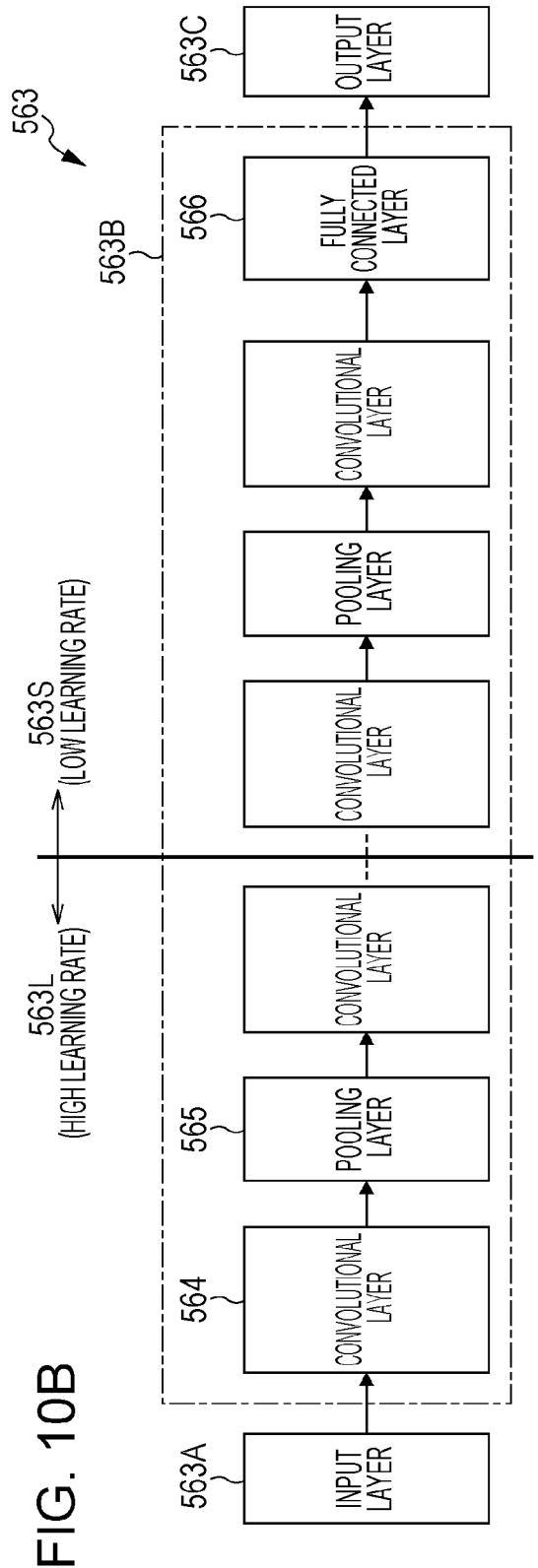

FIGS. 10A and 10B are diagrams illustrating states in which the second CNN 563 constituted by an input layer 563A, the intermediate layer 563B, and an output layer 563C is divided into "layers near the input side" and "layers near the output side" on the basis of "whether or not a fully connected layer is included". FIG. 10A illustrates a state in which all the layers except the fully connected layer 566 are regarded as "layers near the input side" (the region 563L) and only the fully connected layer 566 is regarded as a "layer near the output side" (the region 563S). On the other hand, FIG. 10B illustrates a state in which the layers including convolutional layers 564 and pooling layers 565 in addition to the fully connected layer 566 are regarded as "layers near the output side" (the region 563S) and the other layers are regarded as "layers near the input side" (the region 563L). The control unit 530 and the second CNN 563 set the learning rate in the layers included in the region 563L to be higher than the learning rate in the layers included in the region 563S.

Example 3: Setting Based on Presence or Absence of Convolutional Layer

Figure 11:
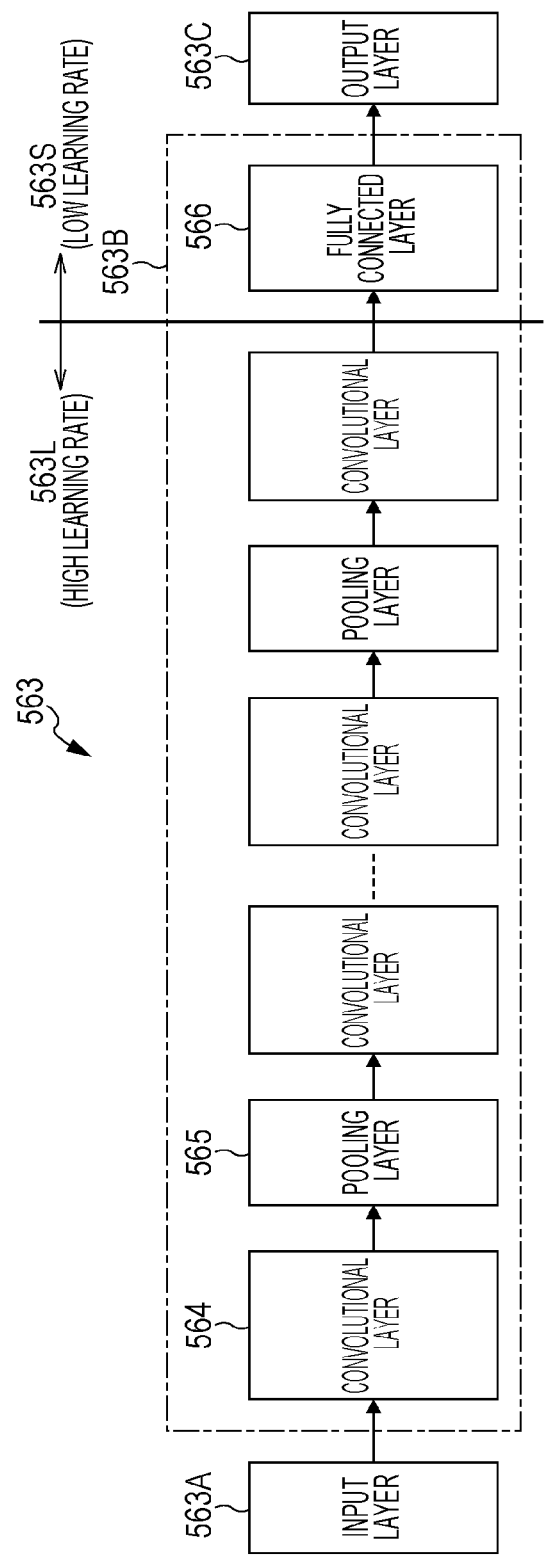
FIG. 11 is a diagram illustrating a state of defining an input-side layer and an output-side layer in accordance with the presence or absence of a convolutional layer.

FIG. 11 is a diagram illustrating a state in which the second CNN 563 is divided into "layers near the input side" and "layers near the output side" on the basis of "whether or not a convolutional layer is included". The layers including convolutional layers are regarded as "layers near the input side" (the region 563L) and only the fully connected layer 566 is regarded as a "layer near the output side" (the region 563S) (in the case of the layer configuration illustrated in FIG. 11, the manner of division is the same as the example illustrated in FIG. 10A). The control unit 530 and the second CNN 563 set the learning rate in the layers included in the region 563L to be higher than the learning rate in the layers included in the region 563S.

In the setting of learning rates, the learning rate in a layer near the output side can be set to zero (fixed). A fixed value may be set as a learning rate to each layer, or learning rates may be set so as to consecutively increase from a layer on the output side toward a layer on the input side. In the case of setting learning rates in accordance with an epoch (the number of repetitions of learning), the learning rates may be set so that the above-described relative magnitudes are realized only at a specific timing (for example, a high learning rate is set in a layer near the input side in an initial stage of learning, and the same learning rate is set in all the layers after a certain epoch).

The method for grouping layers at the time of setting learning rates in the present invention is not limited to the above-described methods in examples 1 to 3. In addition, the control unit 530 and the second CNN 563 may set learning rates by using a layer grouping method determined on the basis of input of an instruction from a user among a plurality of grouping methods.

Acquisition and Learning of Second Data Set

After the learning rates are set in step S106, second learning processing is executed in a procedure similar to that of the above-described first learning processing. Because the second CNN 563 is constructed in step S104 and has brought into a state in which the first learning processing has been executed, "the second learning processing is executed after execution of the first learning processing" in accordance with the following process.

The image acquiring unit 510 acquires a second data set selected from an image group (a second image group) of short-wavelength narrow-band-light images (BLI images, BLI (blue laser imaging) is a registered trademark) recorded in the second image database 602 (a data set selected from the second image group having an identity different from that of the first image group) (step S108: second learning processing), inputs the acquired second data set to the second CNN 563, and causes the second CNN 563 to learn the second data set (step S110: second learning processing). Also in the second learning processing, as in the first learning processing, a data set constituted by a plurality of mini batches may be used as the second data set. The second CNN 563 calculates a feature map through convolutional operation similarly to the first CNN 562, and outputs a detection result (or a discrimination result) of a region of interest. The second CNN 563 and the error calculating unit 568 may execute error back propagation processing. The control unit 530 and the second CNN 563 repeat the second learning processing until an affirmative determination is made in step S112. If a negative determination is made, the process returns to step S108. An affirmative determination is made in step S112, for example, if learning of the data set has been repeated a designated number of times or if the error has converged.

According to the first embodiment, images having different identities can be efficiently learned through the above-described first learning processing and second learning processing. In a case where the first image group (first data set) is constituted by white-light images and the second image group (second data set) is constituted by short-wavelength narrow-band-light images (BLI images) as in the first embodiment, it may be impossible to prepare a sufficient amount of second image group. However, the above-described first learning processing and second learning processing make it possible to efficiently learn the second image group (second data set) having a small amount of data.

Recognition Processing

The image processing system 1 according to the first embodiment is capable of performing recognition processing by using the CNNs constructed through the above-described first learning processing and second learning processing. In the recognition processing, the first CNN 562 that has executed the first learning processing serves as a first leaned model (a first recognizer) and outputs a recognition result of an input data set (for example, a detection result or a discrimination result of a region of interest). Similarly, the second CNN 563 that has executed the first learning processing and the second learning processing serves as a second leaned model (a second recognizer) and outputs a recognition result of an input data set. Hereinafter, the procedure of the recognition processing will be described.

Data Set Acquisition Processing

The image acquiring unit 510 (a data set acquiring unit) acquires a data set for recognition constituted by images under control by the control unit 530 (step S114: recognition processing, data set acquisition processing). The data set for recognition may be constituted by the images recorded in the first image database 601 or the second image database 602 (white-light images or BLI images), or may be constituted by the images acquired by the image acquiring unit 510 from the endoscope system 10 or another system. The image acquiring unit 510 may determine "the database, apparatus, or system from which the data set for recognition is to be acquired" on the basis of an input of an instruction from a user via the operation unit 520.

Identity Acquisition Processing

The image acquiring unit 510 (an identity acquiring unit) acquires the identity of the data set acquired in step S114 under control by the control unit 530 (step S116: recognition processing, identity acquisition processing). Specifically, the "identity" is information indicating, for example, "the data set is constituted by normal-light images (white-light images) acquired by the endoscope system 10 and recorded in the first image database 601". The identity may include, in addition to or instead of such information, identification information of an imaging device, information on a light source, the details of image processing, an imaging portion, an attribute of a subject, or the like. The identity information may be recorded in and acquired from the first image database 601 or the second image database 602. Alternatively, the image acquiring unit 510 may acquire the identity information from the endoscope system 10 or another system. For example, the identity information may be input by a user via the operation unit 520 or may be acquired from the setting information of an apparatus (in the case of a light source mode or an image processing parameter), an output result of a recognizer that recognizes an identity from an image (for example, a recognizer that recognizes a portion of a subject from an image) may be used, or patient information input at the time of diagnosis (in the case of an identity such as the age or sex of a subject) may be used.

Input Control Processing

The control unit 530 (an input control unit) inputs the data set to at least one of the first recognizer (the first CNN 562) or the second recognizer (the second CNN 563) in accordance with the identity acquired in step S116 (steps S118, S120, and S124 in FIG. 7: recognition processing, input control processing). Specifically, the control unit 530 determines "whether or not the acquired identity of the data set is closer to the identity of the first data set used in the first learning processing than the identity of the second data set used in the second learning processing" (step S118: recognition processing, input control processing). If "the acquired identity of the data set is closer to the identity of the first data set used in the first learning processing" (in the above-described example, if the data set for recognition is constituted by white-light images), an affirmative determination is made in step S118, and the control unit 530 inputs the data set to the first recognizer (the first CNN 562) (step S120: recognition processing, input control processing). If a negative determination is made in step S118, the control unit 530 inputs the data set to the second recognizer (the second CNN 563) (step S124: recognition processing, input control processing).

The identity of the data set used in recognition processing need not be entirely identical to the identity of the data set used in learning processing. For example, in a case where first learning processing and second learning processing are performed by using white-light images and short-wavelength narrow-band-light images (BLI images) as the first data set and the second data set, respectively, as described above, the data set for recognition can be input to the first recognizer if the data set for recognition is constituted by LCI images (LCI: linked color imaging, registered trademark), and the data set for recognition can be input to the second recognizer if the data set for recognition is constituted by BLI-brt images (BLI-bright images). Such input is allowed because LCI images and BLI-brt images have color characteristics close to those of white-light images and BLI images, respectively, and thus improvement of recognition accuracy can be expected by the above-described control rule.

Output of Recognition Result

The first recognizer or the second recognizer that has received the data set outputs a recognition result (step S122 or step S126: recognition processing, output processing). The recognition result is output by, for example, displaying a detection result or discrimination result of a region of interest on the monitor 542, and/or by recording the detection result or discrimination result in the recording unit 550. The details of the output vary according to the configuration of the recognizer (detection, discrimination, or the like of the region of interest). After the recognition result is output, the control unit 530 determines whether or not the recognition processing has finished (step S128: recognition processing), and repeats the process from step S114 to step S126 until an affirmative determination is made. Upon an affirmative determination being made in step S128, the recognition processing ends.

In the flowchart illustrated in FIG. 7, a description has been given of the case of inputting a data set to one of the first and second recognizers in the input control processing. Alternatively, the mode in which "the control unit 530 inputs a data set to both the recognizers and outputs a recognition result of one of the recognizers (the recognizer provided with a data set for recognition whose identity is closer to the identity of the data set used in learning processing)" may be adopted. In this case, the control unit 530 inputs, for example, a data set for recognition constituted by white-light images to each of the first and second recognizers, and causes a recognition result of the first recognizer to be output (displayed).

As described above, in the image processing system 1 according to the first embodiment, images having different identities can be efficiently learned through first learning processing and second learning processing, and an image can be accurately recognized by a constructed recognizer in accordance with the identity of a data set.

Others

In the above-described first embodiment, a description has been given of the case of performing learning and recognition by the image processing apparatus 500. Alternatively, the configuration of the image processing apparatus 500 may be included in the endoscope system 10 (for example, the image processing unit 204 of the processor 200). In addition, the first image database 601 and the second image database 602 may be included in the recording unit 207 of the processor 200. In the first embodiment, a description has been given of learning and recognition using normal-light images (white-light images) and short-wavelength narrow-band-light images (BLI images). Alternatively, learning and recognition may be performed by using normal-light images and another type of narrow-band-light images (for example, long-wavelength narrow-band-light images such as LCI images). Alternatively, learning and recognition may be performed by using a plurality of normal-light images having different identities or a plurality of narrow-band-light images having different identities. In the case of using a plurality of narrow-band-light images, a plurality of types of blue narrow-band light, blue narrow-band light and violet narrow-band light, a plurality of types of red narrow-band light, or the like may be used as a combination of narrow-band light.

In the above-described first embodiment, a description has been given of the case of performing learning and recognition by using endoscopic images as an aspect of medical images. The image processing apparatus and the image processing method according to the present invention can also be applied to the case of using medical images other than endoscopic images, such as a computed tomography (CT) images, a magnetic resonance imaging (MRI) images, or an ultrasound images.

Furthermore, the image processing apparatus and the image processing method according to the present invention can also be applied to the case of using images other than medical images (for example, images of people, animals, sceneries, buildings, or industrial products). For example, learning and recognition of damage images of buildings (images of damage such as cracks, peeling, or floating) can be performed by using images that are different in the imaging device, observation light (visible light and infrared light, or the like), exposure conditions, image processing parameters, or the like (these are an example of "identity").

The embodiment of the present invention and other examples have been described above. The present invention is not limited to the above-described aspects and various modifications can be made without deviating from the spirit of the present invention.

REFERENCE SIGNS LIST 1 image processing system
10 endoscope system
100 endoscope main body
102 handheld operation section
104 insertion section
106 universal cable
108 light guide connector
112 soft part
114 bending part
116 tip rigid part
116A distal-end-side surface
123 illumination unit
123A illumination lens
123B illumination lens
126 forceps port
130 imaging optical system
132 imaging lens
134 imaging element
136 driving circuit
138 AFE
141 air/water supply button
142 suction button
143 function button
144 imaging button
170 light guide
200 processor
202 image input controller
204 image processing unit
205 communication control unit
206 video output unit
207 recording unit
208 operation unit
209 audio processing unit
209A speaker
210 CPU
211 ROM
212 RAM
300 light source apparatus
310 light source
310B blue light source
310G green light source
310R red light source
310V violet light source
330 diaphragm
340 condenser lens
350 light source control unit
400 monitor
500 image processing apparatus
510 image acquiring unit
520 operation unit
530 control unit
540 display unit
542 monitor
550 recording unit
560 processing unit
562 first CNN
562A input layer
562B intermediate layer
562C output layer
563 second CNN
563A input layer
563B intermediate layer
563C output layer
563E region
563L region
563S region
564 convolutional layer
565 pooling layer
566 fully connected layer
568 error calculating unit
601 first image database
602 second image database
F1 filter
F2 filter
Fn filter
S100 to S128 individual steps of image processing method

What is claimed is:

1. An image processing method for an image processing apparatus comprising a hierarchical network that receives an image and outputs a feature quantity of the image, the image processing method comprising:

executing first learning processing of inputting a first data set selected from a first image group to the hierarchical network and of causing the hierarchical network to learn the first data set; and executing, after execution of the first learning processing, second learning processing of inputting a second data set selected from a second image group having an identity different from an identity of the first image group to the hierarchical network and of causing the hierarchical network to learn the second data set, learning being performed in the second learning processing with a learning rate in a layer near an input side of the hierarchical network being set to be higher than a learning rate in a layer near an output side of the hierarchical network, wherein the first data set and the second data set are common in a task as detection of a specific photographic subject, wherein the identity of the first image group indicates the first data set is constituted by first medical images recorded in a first image database and the identity of the second image group indicates the second data set is constituted by second medical images recorded in a second image database.

2. The image processing method according to claim 1, wherein one or more images constituting the first data set input in the first learning processing and one or more images constituting the second data set input in the second learning processing are different from each other in an imaging device.

3. The image processing method according to claim 1, wherein one or more images constituting the first data set input in the first learning processing and one or more images constituting the second data set input in the second learning processing are different from each other in image processing performed on the images.

4. The image processing method according to claim 1, wherein one or more images constituting the first data set input in the first learning processing and one or more images constituting the second data set input in the second learning processing are different from each other in a portion of a subject captured in the images.

5. The image processing method according to claim 1, wherein one or more images constituting the first data set input in the first learning processing and one or more images constituting the second data set input in the second learning processing are different from each other in an attribute of a subject.

6. The image processing method according to claim 1, wherein a data set constituted by one or more medical images is input in the first learning processing and the second learning processing.

7. The image processing method according to claim 6, wherein one or more endoscopic images constituting the first data set input in the first learning processing and one or more endoscopic images constituting the second data set input in the second learning processing are different from each other in a wavelength balance of observation light.

8. The image processing method according to claim 1, wherein the hierarchical network is a convolutional neural network.

9. The image processing method according to claim 1, wherein
in a case where an image input to the hierarchical network has a first size, and a size smaller than the first size is a second size,
learning is performed in the second learning processing with the learning rate in the layer near the input side being set to be higher than the learning rate in the layer near the output side, the layer near the input side being a layer to which data having a size greater than the second size is input among layers constituting the hierarchical network, the layer near the output side being a layer to which data having a size smaller than or equal to the second size is input among the layers constituting the hierarchical network.

10. The image processing method according to claim 1, wherein
the hierarchical network has a convolutional layer and a fully connected layer, and
learning is performed in the second learning processing with the learning rate in the layer near the input side being set to be higher than the learning rate in the layer near the output side, the layer near the input side being a layer not including the fully connected layer among layers constituting the hierarchical network, the layer near the output side being a layer including the fully connected layer among the layers constituting the hierarchical network.

11. The image processing method according to claim 1, wherein
the hierarchical network has a convolutional layer and a fully connected layer, and
learning is performed in the second learning processing with the learning rate in the layer near the input side being set to be higher than the learning rate in the layer near the output side, the layer near the input side being a layer including the convolutional layer among layers constituting the hierarchical network, the layer near the output side being a layer not including the convolutional layer among the layers constituting the hierarchical network.

12. The image processing method according to claim 1, wherein the learning is performed in the first learning processing by using, as the first data set, a data set constituted by a number of images, the number of images being greater than in the second data set.

13. The image processing method according to claim 1, comprising performing
data set acquisition processing of acquiring a data set constituted by one or more images,
identity acquisition processing of acquiring an identity of the one or more images, and
input control processing of inputting, in accordance with the identity, the acquired data set to at least one of a first recognizer that has a first learned model acquired through the first learning processing and that outputs a recognition result of the data set that is input or a second recognizer that has a second learned model acquired through the first learning processing and the second learning processing and that outputs a recognition result of the data set that is input.

14. An image processing apparatus comprising:
a memory; and
a processor, coupled to the memory, wherein the processor is configured to implement:
a learning data acquiring unit that acquires a first data set selected from a first image group and a second data set selected from a second image group having an identity different from an identity of the first image group;
a hierarchical network that receives the first data set or the second data set and outputs a feature quantity; and
a learning control unit that inputs the first data set or the second data set to the hierarchical network and causes the hierarchical network to learn the first data set or the second data set, wherein
the learning control unit executes first learning processing of inputting the first data set to the hierarchical network and of causing the hierarchical network to learn the first data set, and executes, after execution of the first learning processing, second learning processing of inputting the second data set to the hierarchical network and of causing the hierarchical network to learn the second data set, learning being performed in the second learning processing with a learning rate in a layer near an input side of the hierarchical network being set to be higher than a learning rate in a layer near an output side of the hierarchical network,
wherein the first data set and the second data set are common in a task as detection of a specific photographic subject,
wherein the identity of the first image group indicates the first data set is constituted by first medical images recorded in a first image database and the identity of the second image group indicates the second data set is constituted by second medical images recorded in a second image database.

15. The image processing apparatus according to claim 14, wherein the learning is performed in the first learning processing by using, as the first data set, a data set constituted by a number of images, the number of images being greater than in the second data set.

16. The image processing apparatus according to claim 14, wherein the processor is further configured to implement:
- a data set acquiring unit that acquires a data set constituted by one or more images;
- an identity acquiring unit that acquires an identity of the data set;
- a first recognizer that has a first learned model acquired through the first learning processing and that outputs a recognition result of the data set that is input;
- a second recognizer that has a second learned model acquired through the first learning processing and the second learning processing and that outputs a recognition result of the data set that is input; and
- an input control unit that inputs, in accordance with the identity, the acquired data set to at least one of the first recognizer or the second recognizer.

* * * * *